Figure 1:
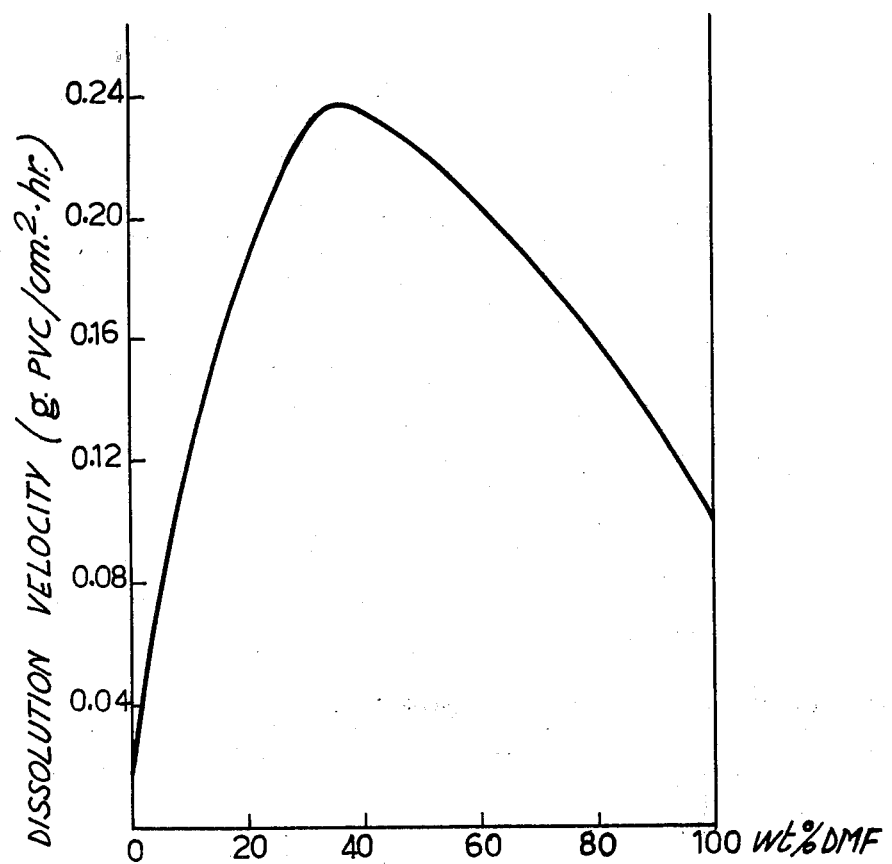

United States Patent [19]

Testa et al.

[11] 3,997,360
[45] Dec. 14, 1976

[54] PROCESS FOR CLEANING VINYL CHLORIDE POLYMERIZATION REACTORS

[75] Inventors: Francesco Testa, Bresso (Milan); Antonio Bigliani, Saronno (Varese), both of Italy

[73] Assignee: Societa Italiana Resine S.I.R. S.p.A., Milan, Italy

[22] Filed: Aug. 11, 1975

[21] Appl. No.: 603,395

[30] Foreign Application Priority Data

Sept. 10, 1974 Italy .................................. 27118/74

[52] U.S. Cl. .............................. 134/22 R; 134/38; 252/153; 252/364; 252/544

[51] Int. Cl.² .......................................... B08B 3/08

[58] Field of Search ................ 134/22 R, 22 C, 38; 252/82, 153, 544, 364; 260/32.6 R

[56] References Cited

UNITED STATES PATENTS 3,764,384  10/1973  Berni ............................... 134/22 R 3,784,477  1/1974  Esposito ......................... 134/38 X

OTHER PUBLICATIONS

*Journal of Polymer Science,* "Effects of Solvent Structure in Polyvinyl Chloride-Solvent Systems", vol. 31, 1958, pp. 77, 79, 80, 83–85, 88.

Primary Examiner—S. Leon Bashore
Assistant Examiner—Marc L. Caroff
Attorney, Agent, or Firm—Christie, Parker & Hale

[57] ABSTRACT

Polymeric deposits formed on internal surfaces of the reactors during polymerization or copolymerization of vinyl chloride are removed by dissolving them at a temperature above 60° C with a solvent mixture comprising from 0 to 7% by weight of water, the remainder consisting of toluene and dimethylformamide in a weight ratio of toluene to dimethylformamide of from 50:50 to 90:10.

6 Claims, 4 Drawing Figures

COMPOSITION OF THE DMF-TL SOLVENT MIXTURE

COMPOSITION OF THE DMF-TL
SOLVENT MIXTURE

PROCESS FOR CLEANING VINYL CHLORIDE POLYMERIZATION REACTORS

The present invention concerns a process for the cleansing of the reactors for the polymerization and copolymerization of vinyl chloride.

More precisely the present invention concerns a process for the removal and recovery in a useful form of the polymer deposits which form on the internal surfaces of the reactors and on related equipment during the polymerization and copolymerization of vinyl chloride.

As a matter of fact, it is known that polymer deposits, which increase gradually, form on the internal surfaces of reactors and on related equipment during polymerization and copolymerization whether in emulsion, or in suspension or in bulk of vinyl chloride, originating compact masses which are hard to move. These masses cause a series of serious problems which concern both the production and the quality of the vinyl chloride polymer or copolymer, which for the sake of simplicity, from now on will be indicated only as polymer.

The parts most likely to be soiled are the internal surfaces of the polymerization autoclaves, especially in the zone of the solution edge, and in the points where the enamel came off and besides the baffles, the shaft, the blades and the hubs of the stirrers, the top of the autoclaves, the orifices and the stub pipes connecting the servicing pipelines, and the internal surfaces of the refluxing condensers.

A serious drawback of this phenomenon is the worsening in the quality of the final polymer on account of the contamination with fragments of crusts and solid particles (fish eyes) which slough off and are incorporated in the polymer itself.

Another drawback is the decrease, due to the deposits of polymeric material, of the exchange capacity of the autoclaves and of the condensers with consequent deteriorations of the thermal conductivity and therefore, also of the potentiality of the said autoclaves.

A further drawback, besides a remarkable decrease of the yield of the process is the gradual occlusion of the orifices and of the stub pipes connecting the servicing pipelines.

This fact, besides implying difficulties in the charging of the reactor, may cause dangerous situations on account of the occlusion of the pipe to the safety valve.

Therefore, after a certain degree of soiling is reached, it is necessary to remove the scales from the internal surfaces of the reactors and from the related equipments. In general this removing operation is performed manually by one or more operators, which after being lowered inside the autoclave, must break and detach the scales, which sometimes are very sticky, with the help of hammers, chisels or other tools.

This mode of operation implies, however, a further series of drawbacks. In particular, the working conditions are very hard and dangerous for the operator who is compelled to work in a narrow, closed and humid environment, in the midst of vinyl chloride monomer fumes and in precarious equilibrium.

The extreme easiness of falling tools or of accidental bumps, may cause considerable damages to the enamelled surfaces with consequent easier and more rapid soiling of the internal surfaces themselves during the polymerization. These cleansing operations, being completely manual in nature, require also several operators and very long idle periods, with consequent decrease of the producing capability of the plant, and therefore with negative effect on the costs.

For these reasons, in order to overcome the afore mentioned drawbacks, attempts have been made to resort to techniques different from the manual one, however with practical results, which until now have been very discouraging and always partial. For example it has been tried to reduce the soiling of the reaction vessel by a careful choice of the reaction conditions and the addition of special additives to the reaction mixture. Some have proposed the washing of the autoclave with jets of water under high pressure, even with automatic systems of spraying, after each cycle of polymerization.

Still others have resorted to the cooling, with water or other fluids at low temperature, of the critical points of the reaction apparatus (solution edge, top, stub pipes connecting the pipelines, baffles etc.) to prevent the polymerization and copolymerization of the vinyl chloride in these points. There are still others who have applied to the critical points, compounds capable of preventing the polymerization in these points.

These methods allow only a slowing down of the growth of the scales, without avoiding the manual cleansing with all its drawbacks and dangers as already described.

It has been proposed, more recently, to use solvents introduced into the reaction vessel, once the reaction product has been discharged, which dissolve and completely remove the polymer crusts from every point of the system.

Thus the use of 1,2 dichloroethane sprayed on the walls of the autoclave has been suggested. However the efficiency of the cleansing is conditioned, in this case, by the humidity content of the polymer crusts. Therefore it is expedient in this case to perform first a long and difficult drying operation.

It has been proposed also to use tetrahydrofuran, which is known to be a good solvent for the polymers and copolymers of vinyl chloride. The cleansing operation is carried out at a temperature of 80°–100° C, under stirring, by filling the autoclave completely with solvent which is continuously recycled. Although tetrahydrofuran is a good solvent, it presents, however, some drawbacks which made it inconvenient for the cleansing of the reactors for the polymerization and copolymerization of vinyl chloride. First of all, tetrahydrofuran is an expensive solvent, so that even moderate losses affect heavily the economy of the process. Besides, its dissolving power is very much influenced by the presence of water and is drastically reduced by water concentrations higher than 8%.

After regeneration of the solvent, amounts of water of the order of 6–8% remains always in the same, and therefore said regenerated solvent results limited in its efficiency as a solvent. Since the polymer crusts retain a remarkable amount of water, the 8% limit is rapidly exceeded. In practice after a few, generally only two, cleansing operations of an industrial reactor the tetrahydrofuran must be conveyed again to the regeneration system with heavy increase on the costs of the entire process.

Finally, tetrahydrofuran has a relatively low boiling point, so that when the hot solution is discharged at the end of the washing, there remains on the walls a deposit of vinyl chloride polymer originating from the evaporation of the solvent wetting the walls. For a total cleansing it is indispensable to perform a spraying with fresh solvent. Because of the high volatility the losses of solvent are on the whole remarkable.

The object of the present invention is a process for the cleansing of the reactors for the polymerization and copolymerization of vinyl chloride by means of a solvent which allows in a substantially complete way the avoidance of the drawbacks of the prior technique.

The present invention provides a process for the cleansing of the reactors for the polymerization and copolymerization of vinyl chloride by removal with a solvent of the polymeric deposits formed on the internal surfaces of the reactors and on related equipment during the polymerization and copolymerization operations, characterized by bringing into contact with said polymeric deposits at a temperature of at least 60° C a solvent mixture comprising from 0 to 7% by weight of water, the remainder consisting of toluene and dimethylformamide in a weight ratio of toluene to dimethylformamide of from 50:50 to 90:10, and preferably from 55:45 to 75:25.

Figure 2:
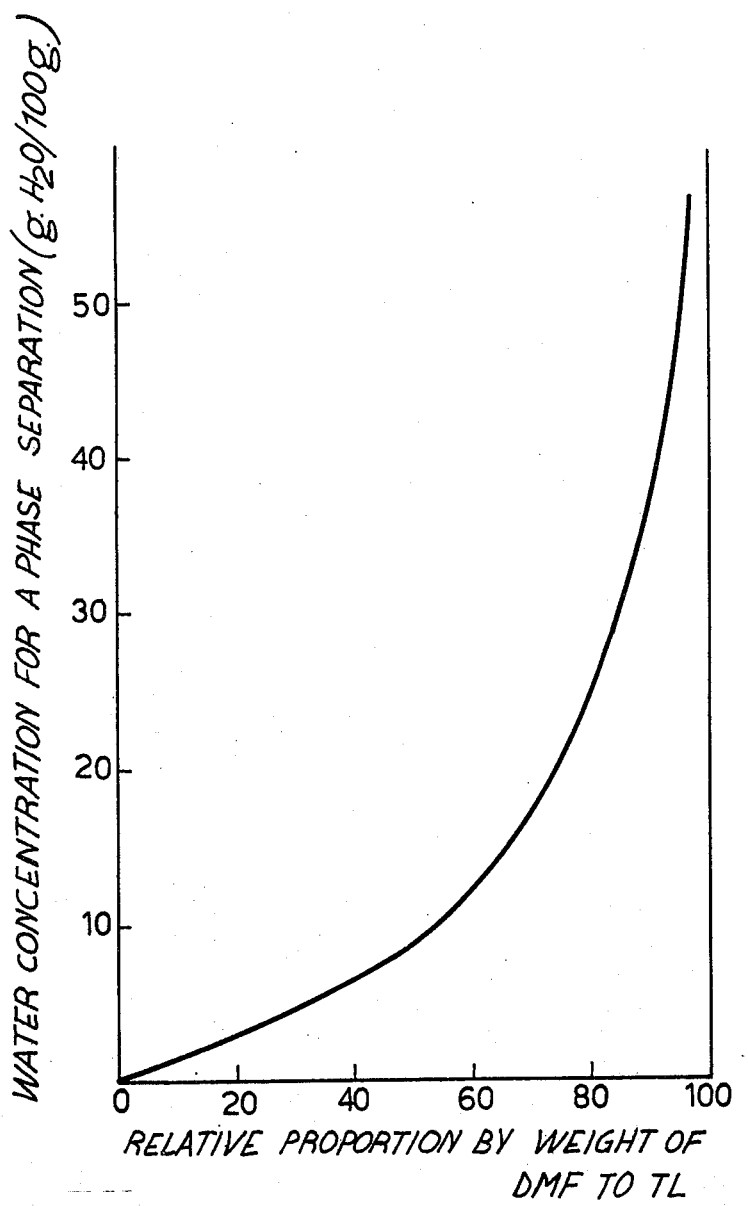

In the accompanying drawings,

FIG. 1 is a diagram showing the variation of the initial dissolution velocity of a sample of polyvinyl chloride (PVC) in a solvent mixture consisting of toluene (TL) and dimethylformamide (DMF) as a function of the composition of the solvent mixture, said dissolution velocity being expressed, in ordinate, in grams of PVC dissolved per $cm^2$ of liquid-solid interface surface and per hour, and said composition being expressed, in abscissa, in wt.% of DMF in the solvent mixture, FIG. 2 is a diagram showing the variation of the minimum water concentration for obtaining a phase separation in a solvent mixture of toluene (TL), dimethylformamide (DMF) and water as a function of the relative proportion of DMF to TL in the mixture, said water concentration being expressed in grams of $H_2O$ per 100 g of mixture, and said relative proportion being expressed by weight.

Figure 3:
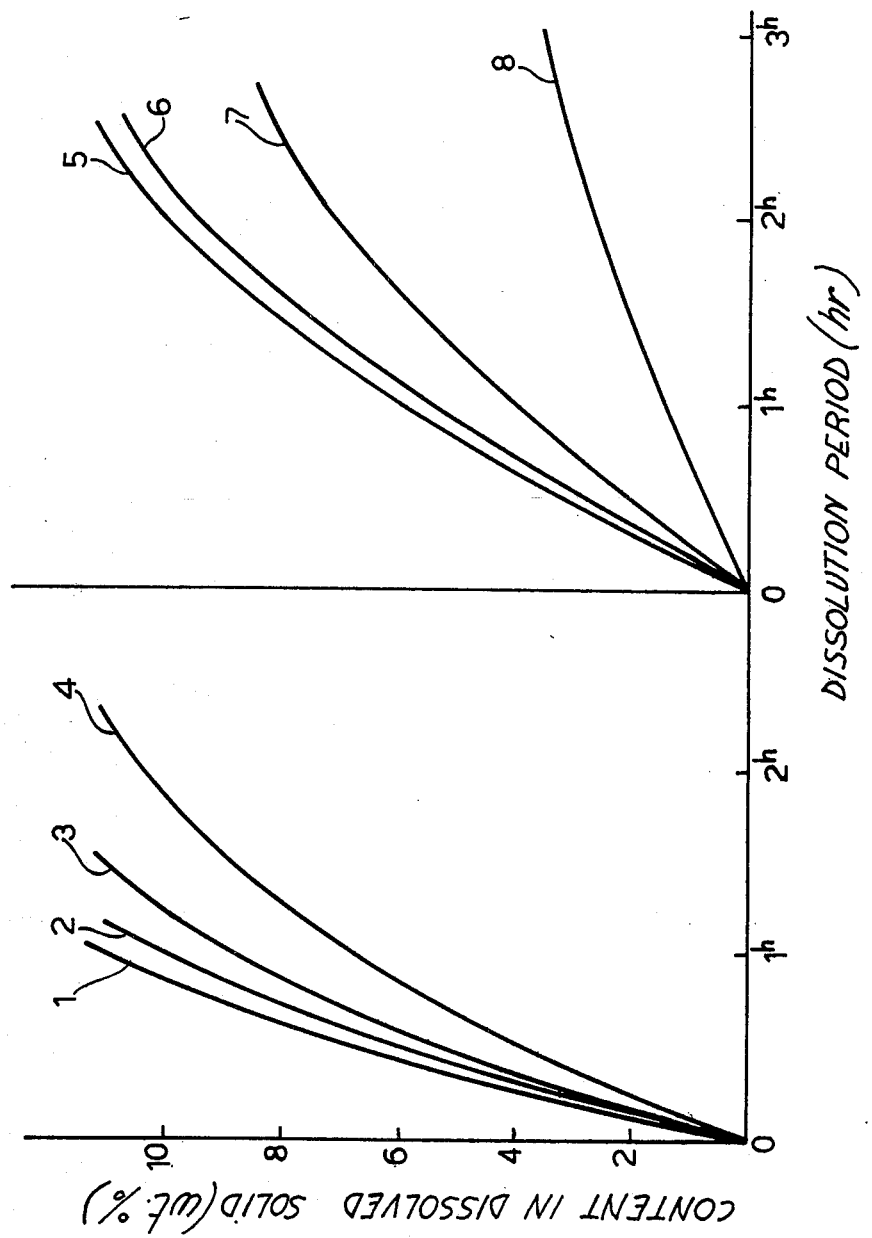
Figure 4:
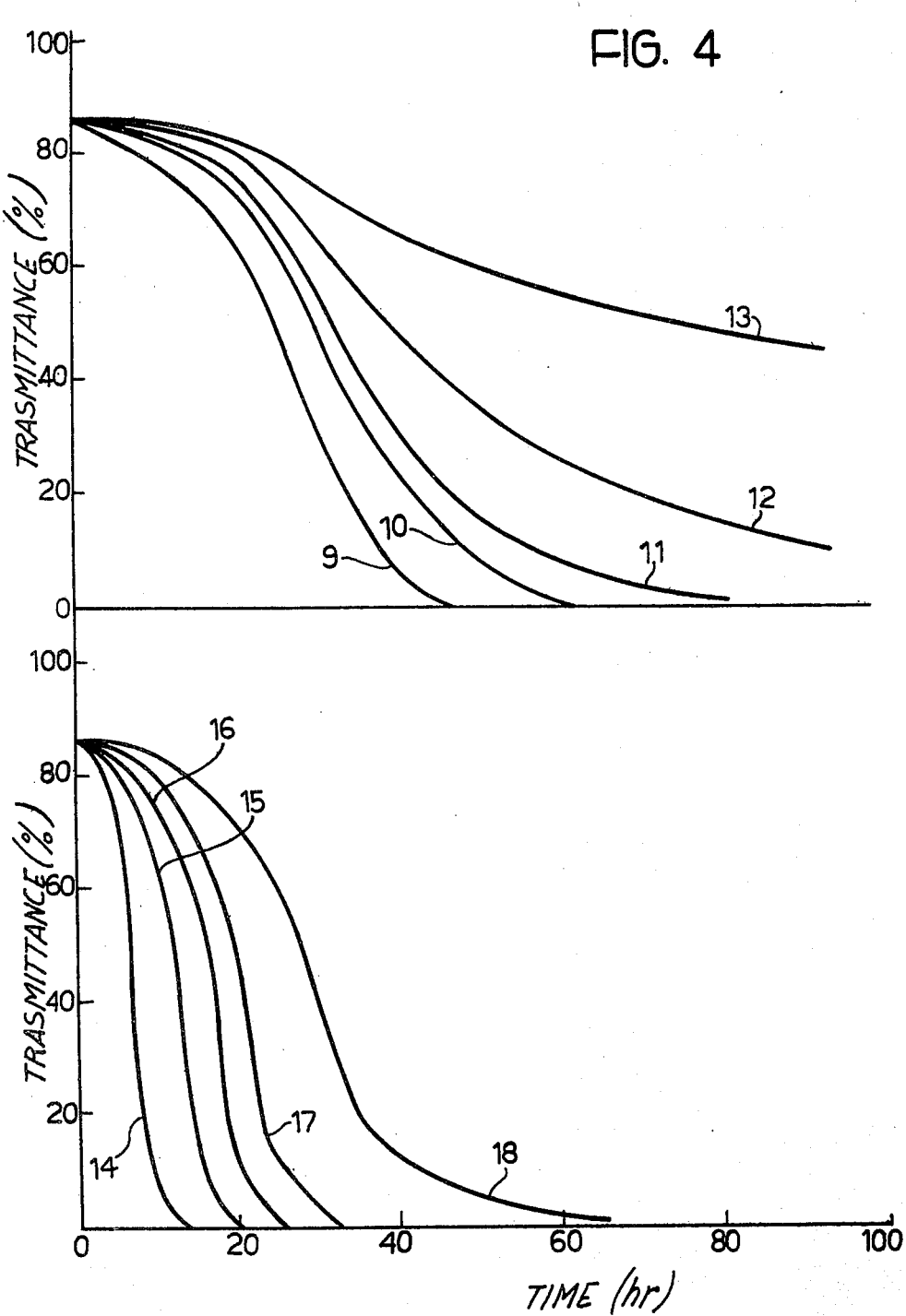

FIG. 3 is a diagram showing the dissolution curves of samples of PVC in DMF-TL solvent mixtures having a different water content (curves 1–4) in comparison with the dissolution curves of said samples in mixtures of DMF and water (curves 5–8), said curves being obtained by plotting the content in dissolved PVC in the resulting solutions, expressed in wt.%, against the dissolution period, expressed in hours, in abscissa, and FIG. 4 is a diagram showing the variations during a heat treatment, of the transmittance of PVC solutions in DMF-TL mixtures having a different water content (curves 9–13) in comparison with the same variations for PVC solutions in mixtures of DMF and water (curves 14–18), said curves being obtained by plotting the transmittance value (in %) in ordinate against the time (in hours) in abscissa.

It is already known in the technique that N,N substituted amides, in particular dimethyl- and diethylacetamide and dimethyl- and diethylformamide are good solvents for the polymers and copolymers of vinyl chloride.

Adam and Klein (J. Pol. Science; XXXI, 77–94 (1958)) have measured the solubility of the polymers of vinyl chloride in the N,N substituted amides and they have also pointed out that, in some cases, the solubility may be improved with the addition of small amounts of aliphatic and aromatic hydrocarbons.

It has been now surprisingly found out that, in terms of velocity of dissolution in hot conditions of the polymer, it is more advantageous to use a solvent mixture consisting of toluene (hydrocarbon) and dimethylformamide in which the hydrocarbon, although it is not a good solvent for the polymer, is the main component.

The best results according to the process of the present invention are obtained with a solvent mixture consisting of toluene and dimethylformamide in which toluene is present in amounts ranging from 55 to 75% by weight, as illustrated in FIG. 1.

This fact is quite unexpected since the behavior of the solvent mixture used in the process of the present invention was not predictable on the basis of that of mixtures of other hydrocarbon homologues of toluene (such as benzene, xylene, ethylbenzene, cumene) and other substituted amides homologue of dimethylformamide (such as, for example, dimethylacetamide), in which mixtures the maximum solvent effect for polymers and copolymers of vinyl chloride is obtained when the hydrocarbon is the minor componente and in every case, is present in amounts lower than 40% by weight.

One of the major problems in the cleansing of the reactors by means of a solvent is the loss of efficiency with time of the solvent used. This phenomenon is related both to the amount of polymer dissolved, and to the compatibility with water of the dissolving mixture, water which accumulates in the solvent during the various phases of the dissolution process of the scales.

In the case of a hydrocarbon-substituted amide mixture this compatibility is strictly dependent on the hydrocarbon content in the mixture.

In particular, the case of the toluene-dimethylformamide mixture is clearly illustrated in FIG. 2. From said Figure it can be seen that the compatibility with water decreases drastically with the increase of the percent of toluene in the mixture.

Moreover, it has been surprisingly found out that this decrease of compatibility does not compromise the dissolution velocity of the polymer in the dissolving mixture, but, as illustrated in FIG. 3, in the conditions and with the toluene/dimethylformamide ratios used in the process of the present invention, the dissolving action remains very effective even at relatively high water concentrations.

Therefore the solvent mixture used in the process of the present invention is very advantageous both for its high dissolution velocity for the scales and because it may be used in a very large number of cleansing cycles, with on danger that the unavoidable accumulation of water in the mixture compromises the result of the operations and without the necessity of having to resort to frequent regenerations of the solvent mixture.

It is known also that during the dissolution in hot conditions of the scales of the polymers and copolymers of vinyl chloride and during the recovery of the solvent from the exhausted solution, some hydrochloric acid is released unavoidably from the polymer. The acid reacts with dimethylformamide to give the hydrochloride of the corresponding amine which, as it has been ascertained, is a strong catalyst for the degradation of the polymers and copolymers of vinyl chloride (Beaugough and Grant — European Polymer Journal 4, 521 (1958). In this way a strongly autocatalytic reaction is primed, which is conducive to a darkening of the solution, to a degradation and formation of cross-links in the dissolved polymers, to an increase of viscosity until the formation of a gelatinous, black-brownish mass is reached.

A further reason for a surprise has been to find out that these phenomena are largely attenuated, as illustrated in FIG. 4, if the dissolving mixture according to the process of the present invention is used. Since the reaction between dimethylformamide and the hydrochloric acid released in the degradation of the polymer is practically quantitative at the operating temperatures of the process of the invention, it was in fact not predictable at all that the mere dilution of dimethylformamide with toluene could slow down substantially the degradation of the polymers of vinyl chloride.

A further reason for a surprise has been to find out, as illustrated in FIG. 4, that water acts in the dissolving mixture as a powerful retarder of the degradation of polymers of vinyl chloride. Consequently it is advantageous to use a solvent mixture containing at least a moderate amount of water, precisely at least 0.7% by weight of water.

On the other side it must be taken into account also that the velocity of dissolution of the polymer decreases rapidly for concentration of water higher than 5–6% by weight and tends to stop for concentration higher than 7% by weight. The useful concentration range, therefore, is from 0.7 to 7% and the preferred one from 1 to 3% by weight.

These are two further reasons why the solvent mixture of the present invention can be used many times without the necessity of frequent regenerations; compatibly with the degree of soiling of the equipment and with the amount of water remaining in the pipes, on the walls of the vessels and absorbed by the scales.

In each case, in order to avoid quantitatively the phenomena of darkening of the solvent mixture, it is always possible to add to the latter small amounts of those products known as heat stabilizers of polymers of vinyl chloride, which are normally added to the polymer during the processing into manufactured products, such as barium and calcium salts, lead salts, calcium and zinc salts, tin salts.

According to the process of the present invention, the dissolution operation is carried out at high temperatures, generally ranging from 60° to 100° C and preferably from 70° to 100° C.

In practice, the solvent mixture is pumped, eventually already heated, until it completely fills the scaled reactor and the auxiliary equipment such as separators, refluxing condensers and pipelines. The dissolving mixture is stirred and maintained in circulation through the auxiliary equipment, at the above indicated temperature levels, for the time necessary to complete the dissolution of the scales. Under the conditions indicated the time generally ranges from 2 to 10 hours, depending on the degree of soiling of the apparatus and on the thickness of the scales to be dissolved. After the dissolution is completed, the solvent is discharged, after cooling if necessary, and conveyed again to the stocking reservoir, to be re-used in subsequent cleansing operations.

When the solvent mixture has accumulated amounts of polymer and of water such that it no more deemed convenient to further use it, amounts generally not higher than 10% and 7% by weight, respectively, it is conveyed to a conventional system of recovery by distillation. The water can be easily separated in a fractionating column in account of the presence of a water-toluene azeotrope. The solvent mixture can be recovered with a purity higher than 99% by distillation and it is again conveyed to the cleansing system.

The process of the present invention is industrially very advantageous and convenient both for the use of low cost solvents that can be re-used many times and that can also be recovered in a practically complete way, and because it can afford a complete cleansing of the reactors for the polymerization of vinyl chloride in a simple and effective way.

The practicality and the high efficiency of the cleansing operations according to the process of the invention make it unnecessary to use enamelled equipment for the polymerization of vinyl chloride, which has remarkable economic advantages.

The invention will be presently illustrated in the following Examples. In the Examples, the parts and percentages are by weight, unless otherwise specified.

EXAMPLE 1

Several tests are performed in order to establish the dependence of the velocity of dissolution of polyvinyl chloride (PVC) on the toluene/dimethylformamide ratio (indicating dimethylformamide for the sake of simplicity by DMF) of a dissolving mixture consisting of toluene and DMF.

Identical samples of commercial rigid PVC pipe with a Fikentscher K value of 65 (Norm DIN 537261) are introduced into 300 ml laboratory flasks containing each the same amount of dissolving mixture in a different weight ratio of toluene to DMF, thermostated at 78° C and stirred by a magnetic stirrer.

In order to follow the kinetics of the dissolution, the increase in percentage of solid (PVC) dissolved in the resulting solution samples of said solution have been taken at intervals of time.

The use of samples of PVC tube for these tests has allowed a large number of experiments under conditions strictly constant to be run.

The velocities of dissolution (calculated between times 0 and 30') obtained in a series of tests carried out with different toluene/DMF weight ratios, are reported in Table 1 and the diagram of FIG. 1.

It can be seen from the diagram of FIG. 1 that the dissolution velocity reaches its maximum level for toluene/dimethylformamide mixtures in which toluene is the main component.

Table 1

| Test No. | TL/DMF ratio | Dissolution velocity ($g/PVC/cm^2.hr$) |
|---|---|---|
| 1 | 100/0 | 0.014 |
| 2 | 90/10 | 0.117 |
| 3 | 80/20 | 0.180 |
| 4 | 65/35 | 0.235 |
| 5 | 50/50 | 0.225 |
| 6 | 35/65 | 0.214 |
| 7 | 20/80 | 0.161 |
| 8 | 0/100 | 0.107 |

EXAMPLE 2

Further tests are carried out as in Example 1, adding to the solvent mixture variable amounts of water, before the introduction of the PVC sample.

A first series of four tests is carried out with a solvent mixture having a weight ratio of toluene to DMF of 65/35 and including variable amounts of water, as indicated in Table 2. The corresponding dissolution curves of the PVC samples are shown in FIG. 3.

A second series of four comparative tests is carried out with DMF alone including also variable amounts of water, as indicated in Table 2. The corresponding dissolution curves of the PVC samples are also shown in FIG. 3.

The dissolution curves of FIG. 3 clearly show that the dissolving action of the toluene/dimethylformamide mixture, in a ratio which is typically within the range used in the process of this invention, remains effective even with high concentrations of water, contrariwise to what occurs with pure dimethylformamide.

Table 2

| Curve No. | TL/DMF ratio | Water content % |
| --- | --- | --- |
| (1) | 65/35 | 0 |
| (2) | 65/35 | 1.7 |
| (3) | 65/35 | 3 |
| (4) | 65/35 | 5 |
| (5) | 0/100 | 0 |
| (6) | 0/100 | 1.7 |
| (7) | 0/100 | 3 |
| (8) | 0/100 | 5 |

EXAMPLE 3

A first series of five stability tests is carried out with 3% solutions of PVC in a solvent mixture having a weight ratio of toluene to DMF to 65/35 and including variable amounts of water, as indicated in Table 3. A second series of five comparative stability tests is carried out with 3% solutions of PVC in DMF including variable amounts of water, as indicated in Table 3.

The solutions are introduced into 100 ml. glass containers. The containers are flushed with nitrogen, hermetically closed and stored in a oven thermostated at 93° C.

At intervals of time the transmittance of the solutions is measured by means of a spectrophotometer set at a wave length of 536 millimicrons. The transmittance decreases gradually because of the increase in coloration and darkening of the solutions during the thermal treatment.

The variations in time of the transmittance of the different solutions are shown in FIG. 4; FIG. 4 clearly shows that the thermal stability of the solutions in the solvent mixture, which is used in the process of the present invention, is, to a great extent, superior to that of the solutions in DMF alone, and that the presence of water makes the former substantially more stable as compared to the latter.

Table 3

| Curve No. | TL/DMF ratio | Water concentration % |
| --- | --- | --- |
| 9 | 65/35 | 0 |
| 10 | 65/35 | 0.3 |
| 11 | 65/35 | 0.7 |
| 12 | 65/35 | 1.0 |
| 13 | 65/35 | 3.0 |

Table 3-continued

| Curve No. | TL/DMF ratio | Water concentration % |
| --- | --- | --- |
| 14 | 0/100 | 0 |
| 15 | 0/100 | 0.3 |
| 16 | 0/100 | 0.7 |
| 17 | 0/100 | 1.0 |
| 18 | 0/100 | 3.0 |

EXAMPLE 4

A 24,000 l enamelled autoclave used for the polymerization in suspension of vinyl chloride, after 10 cycles of polymerization is contaminated by polymer scales on the top, the baffles, the shaft and the blades of the stirrer, and the walls.

A dissolving mixture consisting of toluene and dimethylformamide in the 65/35 ratio by weight is conveyed into the autoclave until it is completely filled. The stirring is started and the temperature is brought to 90° C. After 3 hours the autoclave is cooled and the resulting solution is discharged. Then the autoclave is filled with water in order to remove all traces of solvent. After the water has been discharged the hatch is opened for inspection. It is found that the inside of the autoclave is perfectly clean and every trace of polymer has disappeared.

The analysis of the solution, after the cleansing show the presence of 0.12% of dissolved PVC and of 0.14% $H_2O$.

The solution does not present evident signs of degradation.

We claim:

1. In a method for cleansing surfaces of equipment used for the polymerization of vinyl chloride by removing polymeric deposits therefrom by contact with a solvent, the improvement which comprises contacting polymeric deposits formed on said surfaces at a temperature of at least 60° C with a solvent mixture containing water in amounts up to 7% by weight of the mixture, the remainder consisting of toluene and dimethylformamide in a weight ratio of toluene to dimethylformamide of from 50:50 to 90:10, for a time sufficient to dissolve at least a portion of said polymeric deposits, and subsequently removing said solvent mixture containing dissolved polymeric solids from contact with said surfaces.

2. The method of claim 1, wherein said weight ratio is from 55:45 to 75:25.

3. The method of claim 1, wherein said solvent mixture comprises from 0.7 to 7% by weight of water.

4. The method of claim 1, wherein said solvent mixture comprises from 1 to 3% by weight of water.

5. The method of claim 1, wherein said temperature is from 60° to 100° C.

6. The method of claim 1, wherein said temperature is from 70° to 100° C.

* * * * *

UNITED STATES PATENT AND TRADEMARK OFFICE
CERTIFICATE OF CORRECTION

PATENT NO. : 3,997,360
DATED : December 14, 1976
INVENTOR(S) : Francesco Testa, Antonio Bigliani It is certified that error appears in the above-identified patent and that said Letters Patent are hereby corrected as shown below:

Column 1, line 19, "move" should read -- remove --;
Column 4, line 49, "on" should read -- no --;

Signed and Sealed this

Seventh Day of June 1977

[SEAL]

Attest:

RUTH C. MASON
Attesting Officer

C. MARSHALL DANN
Commissioner of Patents and Trademarks